INVENTORS
Robert Meyer Seddon
Lyle Dana Scarbrough

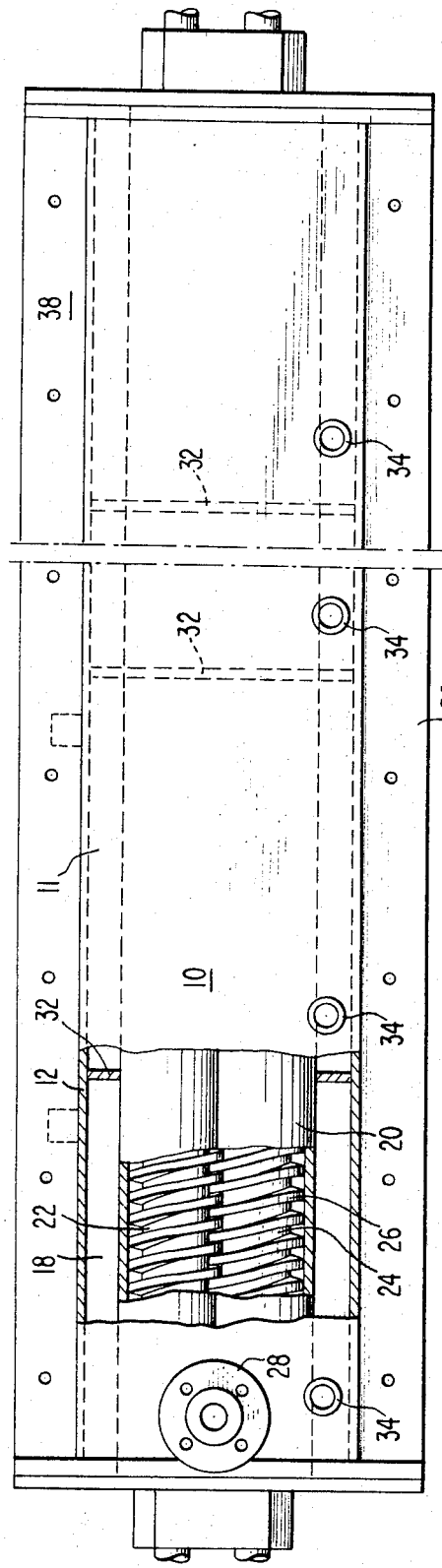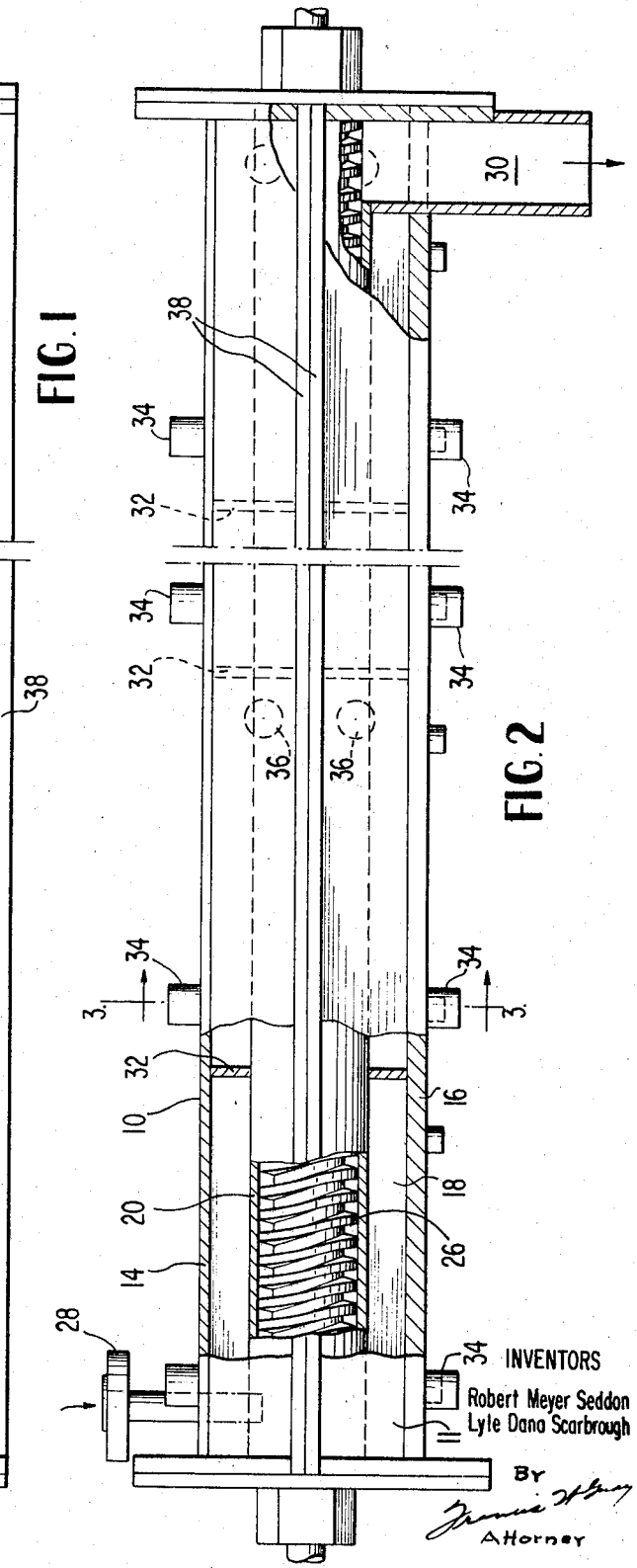

By
Attorney

United States Patent Office 3,442,866
Patented May 6, 1969

3,442,866
PROCESS FOR PRODUCING FINELY DIVIDED SOLID ACETAL COPOLYMERS
Robert M. Seddon and Lyle Dana Scarbrough, El Paso, Tex., assignors to Celanese Corporation, New York, N.Y., a corporation of Delaware
Filed Jan. 7, 1966, Ser. No. 519,359
Int. Cl. C08g 1/04
U.S. Cl. 260—67    8 Claims

ABSTRACT OF THE DISCLOSURE

A process for producing acetal polymers wherein a polyacetal forming polymerization mixture is introduced into a reaction zone comprising an elongated casing substantially following the outer bounaries of at least one pair of intermeshing, parallel screw members contained in said casing, said screw members having their threads running in the same direction and being longitudinally rotated in the same direction, and conveying said polymerization mixture through said zone by axially rotating said screw members while polymerizing at least 60 weight percent of the polymerizable material in said mixture. This provides polyacetal product in the form of finely divided solids.

---

The present invention relates to a polymerization process, and, more particularly, to a polymerization process for producing polyacetal polymers and copolymers.

Polyacetal resins have been known for many years and are found generally disclosed in, for example, Kern et al., Angewandte Chemie 73, pp. 176–186 (Mar. 21, 1961), and Sittig, M., Hydrocarbon Process and Petroleum Refiner 41, pp. 131–170 (1962).

Because of the unique combination of stiffness, toughness and inertness possessed by polyacetal resins, they have achieved widespread use in molded and extruded objects. Generally, the polyacetal is formed by polymerization in the liquid phase, and in the presence of suitable polymerization catalyst. Conversion of the polymerizable material to the polymer is usually substantially complete and the polymer forms a solid or highly viscous polymeric mass filling the entire volume of the reactor. For further processing, such as washing or purification, the polymer mass must be ground, chopped or pulverized. This is costly and many times is commercially impractical in view of the extreme toughness of the polymer. Also, temperature control in the solidified polymer mass is very difficult.

The above problems can be avoided when the polymerization mixture is diluted with a large amount of an inert solvent which prevents solidification of the reactant mass. However, it is often preferable, for the formation of higher molecular weight products or for more rapid polymerization reaction rates, to polymerize reaction mixtures containing little or no solvent.

Accordingly, the primary object of the present invention is to provide a polymerization process for producing polyacetal which overcomes the disadvantages mentioned above. Another object is to provide a polyacetal forming polymerization process which yields a solid or highly viscous polymeric reaction product in the form of powder or finely divided particles.

In accordance with the present invention, a polyacetal forming polymerization mixture is introduced into a polymerization reaction zone comprising an elongated casing which encloses at least one pair of intermeshing, parallel screw members. The parallel screw members are rotated about their longitudinal axis in the same direction, and they have their threads running in the same direction, i.e., either both right or left handed. The polymerization reaction zone is maintained under polymerization conditions of temperature and pressure such that as the rotating screw members convey the mixture through the polymerization zone, the polymerization mixture polymerizes forming a finely divided, solid or highly viscous polyacetal reaction product, which is subsequently withdrawn from the polymerization zone.

It has been found that the intermeshing screw members exert a vigorous mixing and shearing action on the polymerization mixture throughout the polymerization period. Hence, as the solid polymer forms it is broken up into a powder or finely divided solid which is easy to handle in subsequent processing of the polymer. Further, it has been found that by using a polymerization zone such as described above, which is sometimes referred to as a twin-screw polymerization reaction zone, a means is provided for converting a normally liquid polymerization feed mixture into a solid polymer product and still keep the channels open in the reactor mechanism. The polymerization feed mixture normally comprises polyacetal resin forming material, polymerization catalyst and solvent.

To maintain the continuous mixing and shearing action within the polymerization zone as the solid polymer is formed, sufficient power must be applied to the mixing and shearing elements to avoid their becoming frozen or immobilized.

In a preferred embodiment of the present invention the polymerization feed mixture introduced into the polymerization zone contains at least 50 weight percent of trioxane. In addition, the polymerizable material is maintained in the polymerization zone for a period of time sufficient to polymerize at least 60 weight percent thereof. As a result, the polymeric product comprises finely divided solids, thus enabling further processing of the solids without additional grinding, chopping and the like.

POLYACETAL

The term "polyacetal" as used herein refers to a normally solid resin comprising a polymer having at least 60 mol percent recurring oxymethylene (—CH$_2$O—) units. The polyacetal resin may be all oxymethylene units, but generally it comprises at least 60 mol percent and up to about 99.6 mol percent of recurring oxymethylene units, and a minor amount of different units copolymerized therewith. The preferred polyacetal resins are the oxymethylene copolymers, containing a major proportion and preferably above about 60 mol percent of oxymethylene units and a minor proportion, most preferably no more than 15 mol percent, of units containing a —C—C— bond or another structural unit less susceptible to thermal degradation than the aforesaid oxymethylene units.

Most preferably, the polyacetal is an oxymethylene copolymer containing between about 85 and 99.6 mol percent of recurring oxymethylene units interspersed in a chain with from about 0.4 to about 15 mol percent of —OR— units, wherein R is a divalent radical containing at least two carbon atoms directly linked to each other and positioned in the chain between the two valences, with any substituent in the R radical being inert. Preferably, such substituents include hydrocarbons or halohydrocarbons which are inert with respect to formaldehyde under the conditions of polymerization.

Copolymers of the desired structure may be prepared by polymerizing trioxane together with a cyclic ether having adjacent carbon atoms as disclosed in U.S. Patent No. 3,027,352, Walling et al. A particularly preferred class of comonomers are those cyclic ethers having the structure

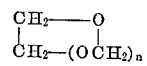

where $n$ is an integer from zero to two.

Among the specific cyclic ethers which may be used in the present invention are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal; paraldehyde; tetrahydrofuran; and butadiene monoxide.

These and other materials may be used with trioxane to form copolymers including terpolymers as well as polymers composed of more than three different monomers. For example, polyacetal terpolymers may suitably contain at least 85 mol percent of oxymethylene units interspersed in a polymeric chain with up to about 15 mol percent of —OR— units, wherein R is a divalent radical containing at least two carbon atoms directly linked to each other and positioned in the chain between the two valences, with any substituent in the R radical being inert, and at least 0.01 up to 7.00 mol percent of said —OR— units of one chain having carbon atoms linked to another chain. More specifically, the above-mentioned class of cyclic ethers may be used with polyepoxides and similar materials to form terpolymers as disclosed in U.S. patent application Ser. No. 229,715 filed Oct. 10, 1962 by W. E. Heinz et al., which application is assigned to the same assignee as the subject application.

The copolymers described above may also incorporate other interspersed monomeric units derived from lactones, carbonates, cyclic acid hydrates or ethylenically unsaturated compounds such as styrene, diformal ether, vinyl acetate, vinyl methyl ketone or acrolein, as disclosed in the abovementioned Kern et al. article. Further, the polymers and copolymers may be endcapped by acylation or esterification after polymerization or during polymerization by the use of selected chain transfer agents. This is also discussed in the Kern et al. article.

In forming copolymers, the comonomer is usually present in the polymerization reaction mixture in amounts between about 0.1 and about 20.0 weight percent, based on the weight of trioxane in the mixture, and preferably in amounts between about 0.1 and about 10.0 weight percent.

Solvent

The polymerization reaction mixture may also contain small amounts of solvents. Among the suitable solvents which may be used are cyclohexane, di-n-butyl ether, benzene, ethylene dichloride, pentane, trichloroethylene, ligroin (90 to 100° C. B.P.), carbon tetrachloride, octane, symmetrical tetrachloroethane, diethyl ether, petroleum ether (30 to 60° C. B.P.) and methylene chloride.

The preferred solvents are cyclohexane and di-n-butyl ether. The amount of solvent present in the feed polymerization mixture is usually in the range of from about 0.25 to 10.0 percent by weight of the polymerizable material present therein. All or a portion of the solvent may be introduced into the reaction zone with the polymerization catalyst, as a carrier therefor. The solvent may also be a chain transfer agent.

Catalyst

While a large number of polymerization catalysts for polyacetal forming materials are operable, the preferred polymerization catalysts are those containing boron fluoride. These include boron fluoride, described in U.S. Patent 2,989,507 of Hudgin and Berardinelli; boron fluoride coordinate complexes with organic compounds in which oxygen or sulfur are donor atoms, described in U.S. Patent 2,989,506 of Hudgin and Berardinelli; boron fluoride coordinate complexes with water, described in U.S. Patent 3,200,096 by Hudgin and Berardinelli; and boron fluoride coordinate complexes with basic trivalent nitrogen or phosphorus compounds having ionization constants in water at 25° C. not higher than about $1 \times 10^{-9}$, described in U.S. Patent No. 2,989,511 of Schnizer. Boron fluoride-ether complexes, such as boron fluoride dibutyl etherate are especially preferred.

The catalyst is usually present in the polymerization mixture in the range of from about 0.0001 to 0.10 percent by weight of the trioxane, based on the catalyst's boron fluoride content. Preferably, amounts in the range of from about .0005 to 0.025 percent are used.

For a more complete understanding of the present invention, its objects and advantages, reference should be had to the following description and to the accompanying drawings in which:

FIGURE 1 is a top view of the polymerization reactor with a cut-away portion showing the location of the screw members;

FIGURE 2 is a side view of the polymerization reactor with cut-away portions near the inlet end and discharge end, and showing the screw members and discharge chute;

Figure 3:
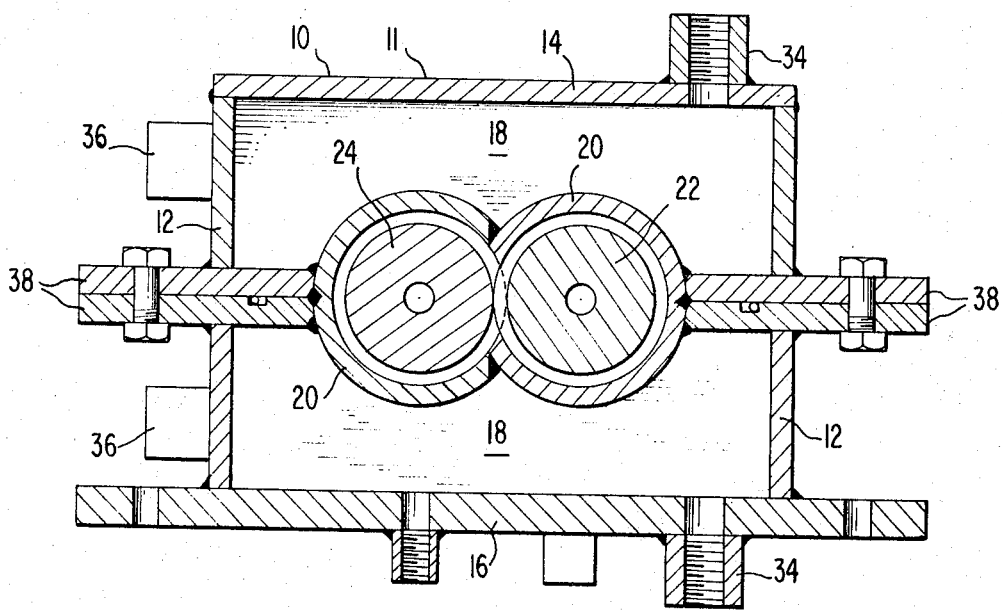
FIGURE 3 is a sectional view through plane 3—3 of FIGURE 2.

Referring to FIGURES 1, 2 and 3 of the drawings, a polymerization reactor 10 is shown. The reactor 10 comprises an outer jacket 11 formed by side walls 12 and top and bottom walls 14 and 16, respectively. A space 18 is provided between the outer jacket 11 and an elongated casing 20, which is positioned therein. The elongated casing 20 contains or encloses a single pair of intermeshing, parallel screw members 22 and 24, having threads 26 thereon. The screw members have their threads running in the same direction, i.e., either both left handed or right handed, and they are also rotated in the same direction, i.e., clockwise or counterclockwise. The elongated casing 20 substantially follows the outer boundaries of the screw members.

Inlet nozzle 28 is provided for the introduction of polymerization feed materials into the casing 20. A discharge chute 30 is provided for the withdrawal and recovery of polymeric reaction products from the casing.

The space 18, between the outer jacket 11 and the elongated casing 20, is provided with a plurality of separating plates 32, so as to divide the space 18 into a plurality of separate heat transfer compartments. A plurality of vertical couplings 34 and horizontal couplings 36 are provided in each of the separate heat transfer compartments for the introduction and withdrawal, respectively, of a heat transfer medium. Conveniently, any cooling or heat transfer medium such as cooled water or a refrigerated water-ethylene glycol solution may be introduced into the space 18 via the vertical couplings 34 and removed via the horizontal couplings 36. The coolant is used in the heat transfer compartments to control the temperature of the polymerization mass within the casing 20 of the reactor 10. By using a plurality of separate heat transfer compartments, coolants at different temperatures may be used so as to compensate for the temperature variations of the polymerization mixture as it passes through the reactor 10.

Referring more particularly to FIGURE 3, the casing 20 is supported within the outer jacket 11 by bolted flange plates 38, which are welded to each side of casing 20 and to the reactor side walls 12.

Figure 4:
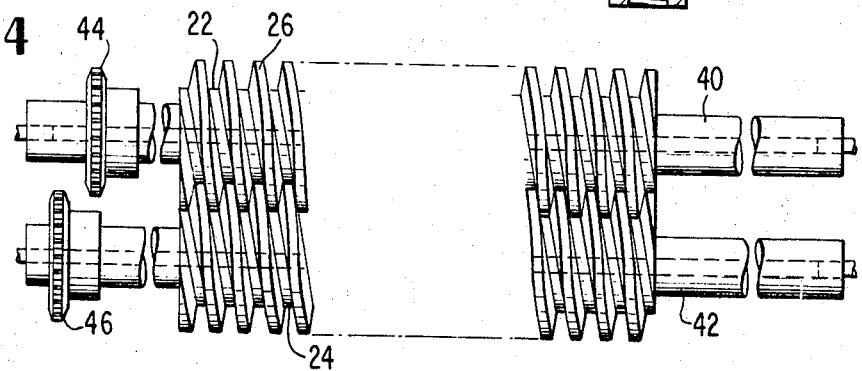
FIGURE 4 is a top view of the end portions of the screw members showing sprocket means for rotating the members.

Referring to FIGURE 4, screw members 22 and 24 are mounted on shafts 40 and 42, respectively, both the shafts and the screw members preferably being hollow along their axes so as to allow cooling liquids such as described above to be circulated therein. Also mounted on the shafts 40 and 42 are sprockets 44 and 46, for the rotation of the screw members 22 and 24 by any suitable driving means (not shown). The ends of shafts 40 and 42 are secured by a conventional supporting means (not shown).

Figure 5:
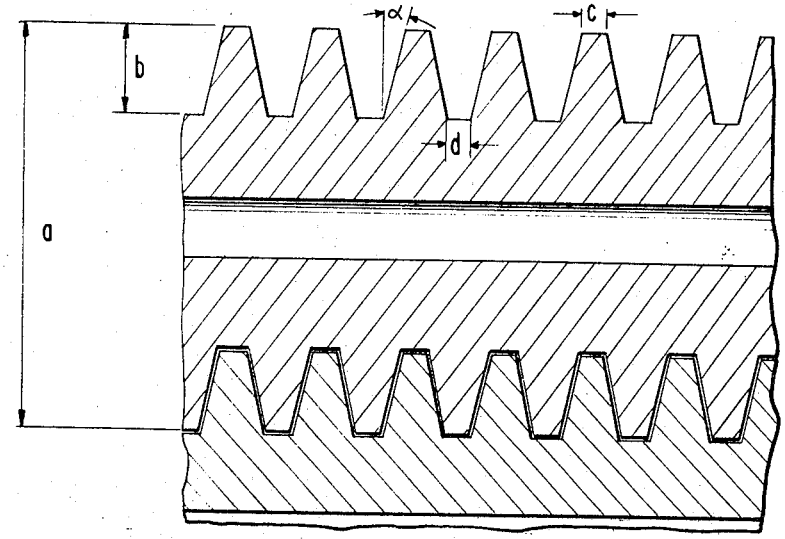
FIGURE 5 is a partial sectional view through the plane of the axes of both screw members, showing the entire breadth of one screw member and a portion of the breadth of the other screw member.

Referring to FIGURE 5, the structure of the intermeshing screw members with truncated peaks and valleys, which is suitable for purposes of the present invention, is defined by (a) the outside diameter of the screw member, (b) the depth of the thread, (c) the width of the crest of the thread, (d) the width of the base of the valley of the thread, and, ($\alpha$) the angle between the sides of the thread and a plane perpendicular to the axis of the screw member.

In the preferred operation of the process of the present invention a polymerization feed mixture is introduced via the nozzle 28, into the casing 20. The polymerization mixture comprises at least 50 percent by weight trioxane, a comonomer such as 1,3-dioxolane or ethylene oxide, a boron fluoride polymerization catalyst and a solvent such as cyclohexane. Preferably, the catalyst is introduced in admixture with the cyclohexane, and in order to avoid premature polymerization, the catalyst is not blended or contacted with the trioxane and comonomer until the materials are about to enter the casing 20. If desired, the catalyst and solvent may be introduced into the casing 20 through a separate feed line (not shown).

The point of discharge of the feed materials into the casing 20 occurs as close as possible to the peripheries of the rotating screw members. In this manner, the feed material is deposited in the intermeshing screw cavities, which is the space or valley formed by the screw threads. The polymerizable matetrial is advanced through the casing 20 by the axial rotation of the screw members 22 and 24, the material being contained in the spaces between the screw members 22 and 24, and the space between the screw members and the inner wall of the casing 20. It has been found that to obtain the finely divided polyacetal product, the clearance or space between the screw members themselves, and the screw members and the casing 20 should be above 0.01 inch, and preferably at least 0.034 inch.

As the polymerization reaction takes places in the reaction zone and the polymeric solids begin to form, the reaction mass changes from a free flowing liquid to an increasingly viscous paste. When the semisolid paste is no longer able to flow at the required rate to match the rotational velocity of the screw member-cavities in which it lies, it breaks up into finely divided solids due to the vigorous mixing and shearing effect caused by the rotating, intermeshing screw members. Essentially no back-mixing of material occurs within the reaction zone 10.

The feed rate of the polymerization mixture and the rotation of the screw members are controlled such that from about 5 to about 40 percent, and preferably no more than about 35 percent of the free volume of the cavities is filled with the essentially liquid polymerization reaction mixture. It has been found that when the above values are exceeded, casing 20 of the reactor 10 becomes overloaded and the screw members jammed. This may be due to the fact that when the trioxane and comonomer polymerize to form a solid mass, which is in turn ground by the intermeshing screw members, the bulk density of the solids decreases, and produces an increase in bulk volume.

After polymerization initiation at temperatures above about 60° C., e.g. at 65 to 80° C., the polymerization mixture is normally maintained in the reactor 10 at a temperature in the range of from about 0 to 116° C., preferably from about 50 to 80° C. It is often desirable to preheat the polymerization feed materials prior to their introduction into the reactor 10 in order to enable the polymerization reaction to proceed immediately upon mixing the trioxane and comonomer with the catalyst.

The reaction time in the polymerization reactor is usually in the range of from about 0.5 to 36 minutes, and preferably in the range of from about 1.5 to 9 minutes. A finely divided or powdery polyacetal polymer product is withdrawn from the reactor 10 via the discharge chute 30. As previously mentioned, to obtain the desired finely divided polymer, at least 60 weight percent of the polymerizable material (trioxane and comonomer) must be converted or polymerized to the polyacetal, and preferably more than 65 percent. Semisolid or viscous masses may be discharged at lower conversion rates.

While only a single pair of intermeshing screw members were used in the above described polymerization reaction zone, any number of intermeshing screw members may be used, if so desired.

The present invention is additionally illustrated by the following example:

Example

A mixture of 100 parts by weight of trioxane, 4 parts of 1,3-dioxolane, 4 parts of cyclohexane, and 42 p.p.m. of boron trifluoride (as the dibutyl etherate complex) were fed to one end of a continuous polymerization reactor of the kind described above. In this particular reactor the threaded portions of the screw members were 4 feet long and comprised 72 threads each. Referring to FIGURE 5 of the drawings, the threads had the following dimensions: $a=2.985$ inches, $b=0.645$ inch, $c=0.078$ inch, $d=0.235$ inch, and $\alpha=15.5°20'$.

The temperature of the reaction mass in the reaction zone was maintained between about 50 and 70° C. The average residence time in the reaction zone was about 3.1'. The reaction product was a fine powder.

About 75 weight percent of the trioxane and dioxolane were converted to the solid polymer during the reaction. The finely divided product polymer had a melting point range between about 167 and 170° C., and had an inherent viscosity of 1.4.

The principal, preferred embodiment, and mode of operation of the present invention have been described in the foregoing specification. However, it should be understood that the invention, which is intended to be protected herein, may be practiced otherwise than as described without departing from the scope of the appended claims.

We claim:
1. A polymerization process for the production of a polyacetal polymer comprising at least 60 mol percent recurring (—$CH_2O$—) units and from about 0.4 to about 15 mol percent of —OR— units, wherein R is a divalent radical containing at least two carbon atoms directly linked to each other, which process comprises:
   (a) introducing a polyacetal forming polymerization mixture into a polymerization reaction zone.
   (b) said reaction zone comprising an elongated casing substantially following the outer boundaries of at least one pair of intermeshing parallel screw members contained therein, said screw members having their threads running in the same direction and being longitudinally rotated in the same direction,
   (c) conveying the polymerization mixture through the reaction zone by axial rotation of the screw members while polymerizing at least 60 weight percent of the polymerizable material in said mixture to obtain polyacetal product in the form of finely divided solids, and
   (d) thereafter withdrawing said finely divided polyacetals solids from said polymerization zone.

2. The process of claim 1 wherein the polymerization mixture also comprises a comonomer, a polymerization catalyst and a solvent.

3. The process of claim 1 wherein the comonomer is ethylene oxide and the solvent is cyclohexane.

4. The process of claim 1 wherein the feed rate of the polymerization mixture and the rotation of the screw members are controlled such that from about 5 to about 40 percent of the free volume of the reaction zone cavities is filled with polymerization mixture and wherein more than 65 weight percent of the polymerizable material in the polymerization mixture is polymerized to form a high molecular weight solid.

5. A process for the polymerization of trioxane which process comprises:
   (a) introducing a polymerization mixture comprising at least 60 weight percent of trioxane, a comonomer having the structure:

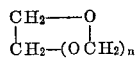

wherein $n$ is an integer of from zero to two, a polymerization catalyst therefor, and a solvent into a polymerization reaction zone,
(b) said reaction zone comprising an elongated casing substantially following the outer boundaries of at least one pair of intermeshing parallel screw members contained therein, said screw members having their threads running in the same direction and being longitudinally rotated in the same direction,
(c) polymerizing more than 65 weight percent of the polymerizable material in said mixture while conveying it without substantial backmixing through the reaction zone by axial rotation of the screw members, thereby obtaining polyacetal product in the form of finely divided solids, and
(d) thereafter withdrawing said finely divided polyacetals solids from said polymerization zone.

6. The process of claim 5 wherein the polymerization reaction zone is maintained at a temperature in the range of from about 0 to 116° C., and the reaction time of the polymerizable material within the reaction zone is in the range of from about 0.5 to 36 minutes.

7. The process of claim 5 wherein the comonomer is 1,3-dioxolane, the polymerization catalyst is a boron fluoride-containing polymerization catalyst and the solvent is di-n-butyl ether.

8. The process of claim 7 wherein the polymerization mixture comprises:
(a) from about 0.1 to about 10 weight percent of 1,3-dioxolane, based on trioxane weight,
(b) polymerization catalyst in the range of from about 0.0001 to about 0.10 percent by weight of trioxane, based on the boron fluoride content of the catalyst, and
(c) from about 0.25 to 10 percent by weight of di-n-butyl ether, based on the weight of the trioxane and the 1,3-dioxolane.

References Cited
UNITED STATES PATENTS 3,253,818  5/1966  Seddon et al. _____ 259—9
3,254,053  5/1966  Fisher et al. _____ 260—67

WILLIAM H. SHORT, *Primary Examiner.*

L. M. PHYNES, *Assistant Examiner.*